US011320934B1

(12) United States Patent
Vaze

(10) Patent No.: US 11,320,934 B1
(45) Date of Patent: May 3, 2022

(54) SYSTEM AND METHOD FOR BIPHASE TOUCH SENSOR PANEL

(71) Applicant: Apple Inc., Cupertino, CA (US)

(72) Inventor: Sagar Rajiv Vaze, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/033,533

(22) Filed: Sep. 25, 2020

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0445* (2019.05); *G06F 3/0446* (2019.05); *G06F 2203/04107* (2013.01)

(58) Field of Classification Search
CPC ............... G06F 3/04166; G06F 3/0445; G06F 2203/04107
See application file for complete search history.

(56) References Cited

U.S. PATENT DOCUMENTS

| | | | |
|---|---|---|---|
| 8,106,668 B2 | 1/2012 | Matsushima | |
| 9,158,407 B2 | 10/2015 | Coulson et al. | |
| 9,727,187 B2 | 8/2017 | Slamkul et al. | |
| 9,904,398 B2 | 2/2018 | Yang et al. | |
| 10,558,305 B2 | 2/2020 | Roberts | |
| 2014/0267067 A1* | 9/2014 | Fuller | ................. G06F 3/04166 345/173 |
| 2016/0266679 A1* | 9/2016 | Shahparnia | ............. G06F 3/044 |
| 2017/0090619 A1* | 3/2017 | Yousefpor | ......... G06F 3/041661 |
| 2018/0088706 A1 | 3/2018 | Tanemura et al. | |
| 2019/0179446 A1* | 6/2019 | Kremin | ................. G06F 3/0416 |
| 2020/0026377 A1 | 1/2020 | Gwon et al. | |
| 2020/0233531 A1 | 7/2020 | Weinerth et al. | |

* cited by examiner

*Primary Examiner* — Liliana Cerullo
(74) *Attorney, Agent, or Firm* — Kubota & Basol LLP

(57) ABSTRACT

Bi-phase touch scanning of a touch sensor panel can reduce interference between touch and display operations for a touch screen including a display and a touch sensor panel. The bi-phase touch scan can include concurrently driving a first plurality of touch electrodes with a first drive signal having a first phase and a second plurality of touch electrodes with a second drive signal having a second phase, different from the first phase (e.g., 180° out of phase for improved charge balancing). In some examples, the bi-phase touch scan can be locally guarded such that adjacent touch electrodes to a sensed touch electrode can be driven with the same drive signal as the sensed touch electrode. In some examples, the bi-phase pattern of driving and sensing can balance charge along an axis and/or in a localized region.

20 Claims, 11 Drawing Sheets

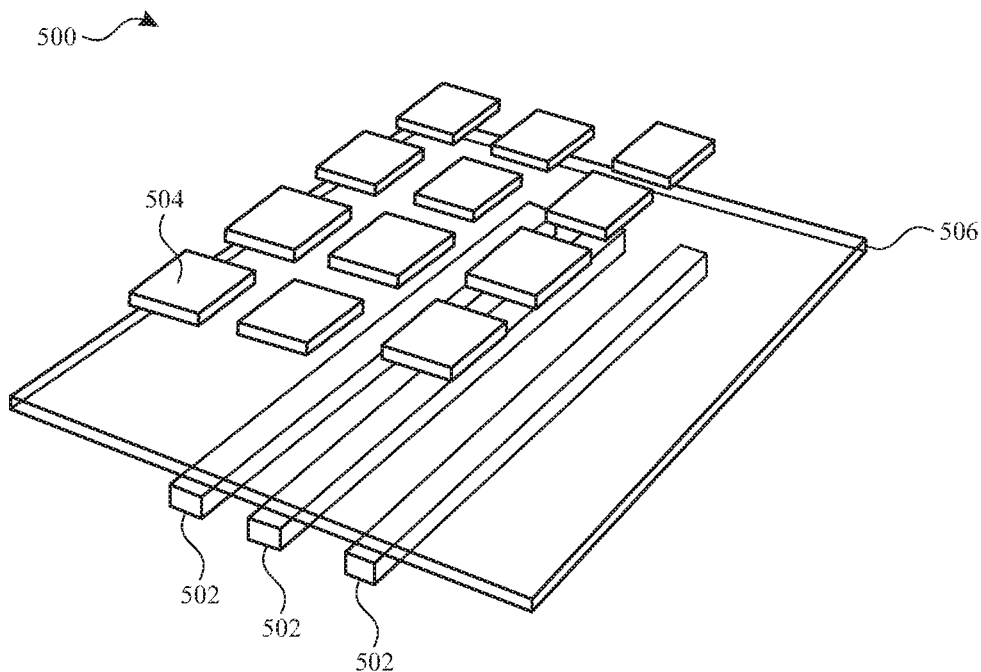
*FIG. 5*
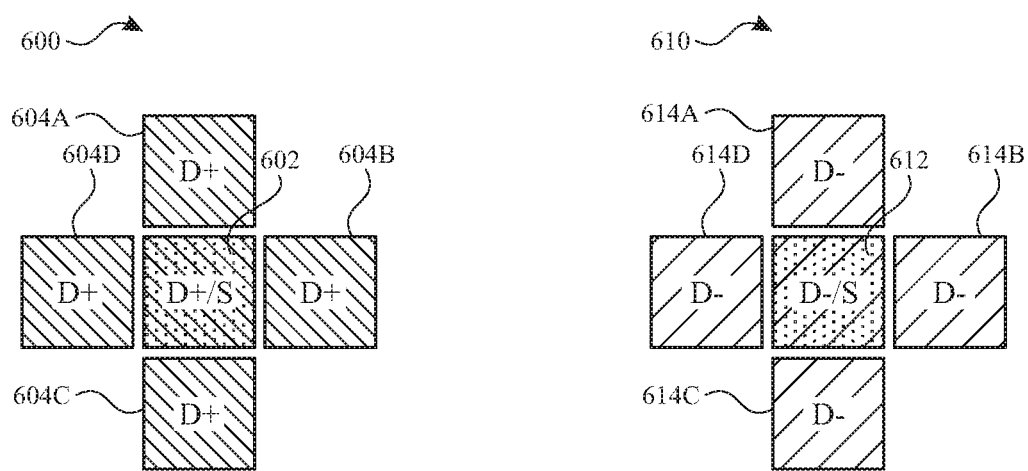
*FIG. 6A*     *FIG. 6B*

SYSTEM AND METHOD FOR BIPHASE TOUCH SENSOR PANEL

FIELD OF THE DISCLOSURE

This relates generally to touch sensor panels, and more particularly to bi-phase operation of a touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. In some examples, a touch screen or touch sensor panel can detect touches by or proximity of multiple objects (e.g., one or more fingers or other touch objects), and such interactions can be used to perform various inputs using multiple objects. Such a touch screen or touch sensor panel may be referred to as a "multi-touch" touch screen or touch sensor panel, and may accept "multi-touch gestures" as inputs.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

This relates generally to touch sensor panels, and more particularly to bi-phase operation of a touch sensor panel. In some examples, to reduce interference between touch and display operations for a touch screen including a display and a touch sensor panel (or touch electrodes), a bi-phase touch scan can be performed including concurrently driving a first plurality of touch electrodes with a first drive signal having a first phase and a second plurality of touch electrodes with a second drive signal having a second phase, different from the first phase (e.g., 180° out of phase). In some examples, the bi-phase touch scan can be locally guarded such that adjacent touch electrodes to a sensed touch electrode can be driven with the same drive signal as the sensed touch electrode. In some examples, the bi-phase pattern of driving and sensing can balance charge along an axis and/or in a localized region. In some examples, the bi-phase touch scan and display update can be concurrent, but the bi-phase touch scan can be performed in a different region of the touch screen than the display update at a given time. In some examples, reference touch electrodes can be sensed (without being driven) to measure noise that can be removed from measurements at sensed touch electrodes. The bi-phase touch scan can improve integration of touch and display systems in a touch screen by reducing interference from the display system impacting the touch system and reducing interference from the touch system impacting the display system. Additionally, or alternatively, the bi-phase touch scan can improve touch detection performance by neutralizing parasitic capacitances of adjacent touch electrodes (e.g., using local guarding) and/or improving the signal level for touch sensing under poor grounding conditions.

BRIEF DESCRIPTION OF THE DRAWINGS

FIG. 5 illustrates an example touch stack up for a touch screen using a pixelated touch node electrode configuration according to examples of the disclosure.

FIGS. 6A-6B illustrate locally guarded patterns for a bi-phase scan according to examples of the disclosure.

DETAILED DESCRIPTION

In the following description of examples, reference is made to the accompanying drawings which form a part hereof, and in which it is shown by way of illustration specific examples that are optionally practiced. It is to be understood that other examples are optionally used and structural changes are optionally made without departing from the scope of the disclosed examples.

This relates generally to touch sensor panels, and more particularly to bi-phase operation of a touch sensor panel. In some examples, to reduce interference between touch and display operations for a touch screen including a display and a touch sensor panel (or touch electrodes), a bi-phase touch scan can be performed including concurrently driving a first plurality of touch electrodes with a first drive signal having a first phase and a second plurality of touch electrodes with a second drive signal having a second phase, different from the first phase (e.g., 180° out of phase). In some examples, the bi-phase touch scan can be locally guarded such that adjacent touch electrodes to a sensed touch electrode can be driven with the same drive signal as the sensed touch electrode. In some examples, the bi-phase pattern of driving and sensing can balance charge along an axis and/or in a localized region. In some examples, the bi-phase touch scan and display update can be concurrent, but the bi-phase touch scan can be performed in a different region of the touch screen than the display update at a given time. In some examples, reference touch electrodes can be sensed (without being driven) to measure noise that can be removed from measurements at sensed touch electrodes. The bi-phase touch scan can improve integration of touch and display systems in a touch screen by reducing interference from the display system impacting the touch system and reducing interference from the touch system impacting the display system. Additionally, or alternatively, the bi-phase touch scan can improve touch detection performance by neutralizing parasitic capacitances of adjacent touch electrodes (e.g., using local guarding) and/or improving the signal level for touch sensing under poor grounding conditions.

Figure 1A:
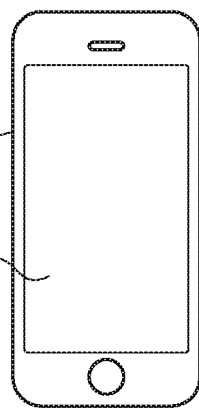
FIGS. 1A-1E illustrate touch sensing devices or systems that can include a touch screen or touch sensor panel according to examples of the disclosure.
Figure 1B:
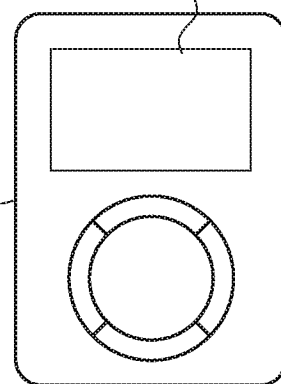
Figure 1C:
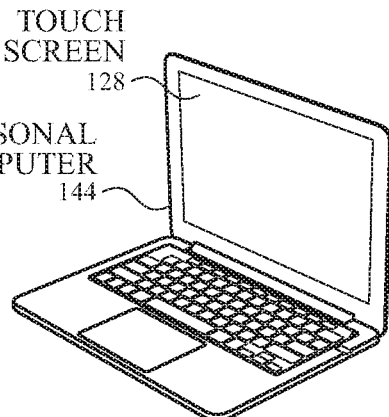
Figure 1D:
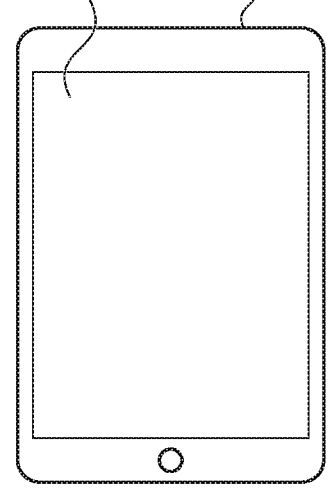
Figure 1E:
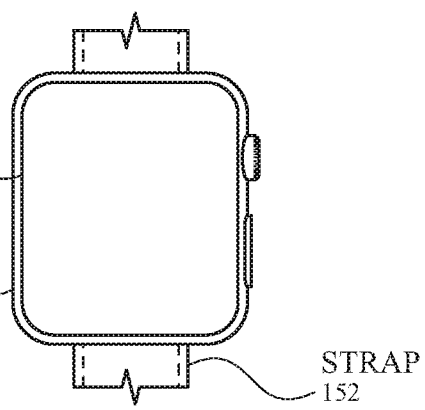

FIGS. 1A-1E illustrate touch sensing devices or systems that can include a touch screen or touch sensor panel according to examples of the disclosure. The touch screen or touch sensor panel can implement bi-phase touch scanning techniques. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1E can further include touch sensor panels on surfaces not shown in the figures. Touch screens 124, 126, 128, 130 and 132 can be multi-touch touch screens that can detect multiple objects.

In some examples, touch screens 124, 126, 128, 130 and 132 and touch sensor panels can be can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it is understood that in some examples, the touch node electrodes on the touch screen/panel can be used to perform scans other than self-capacitance scans on the touch screen/panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc.

In some examples, touch screens 124, 126, 128, 130 and 132 and touch sensor panels can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens 124, 126, 128, 130 and 132 or touch sensor panels can be based on mutual capacitance and/or self-capacitance. The electrodes can be arranged as a matrix of small, individual plates of conductive material (e.g., as in touch node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
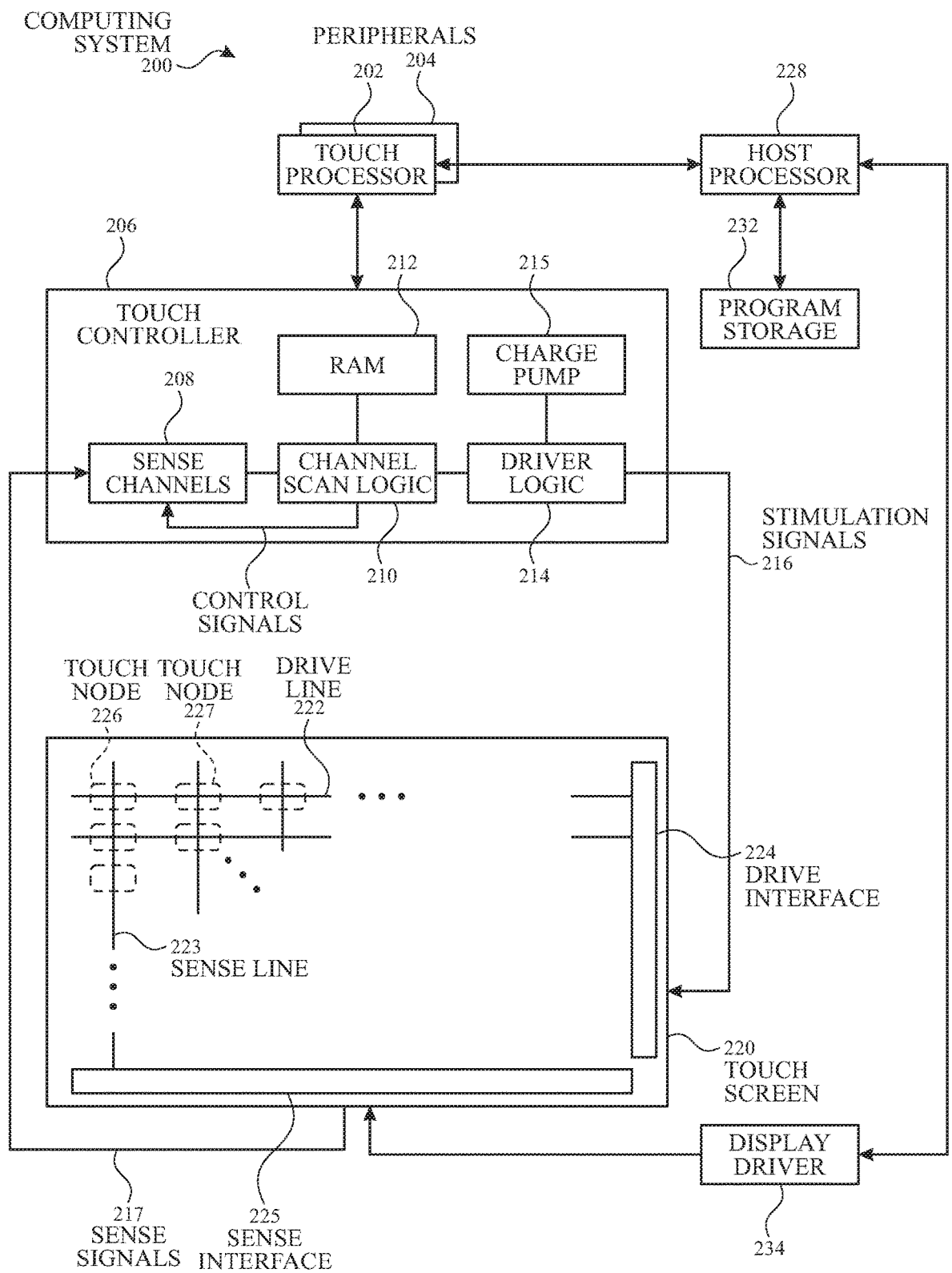
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can implement techniques for bi-phase operation of a touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
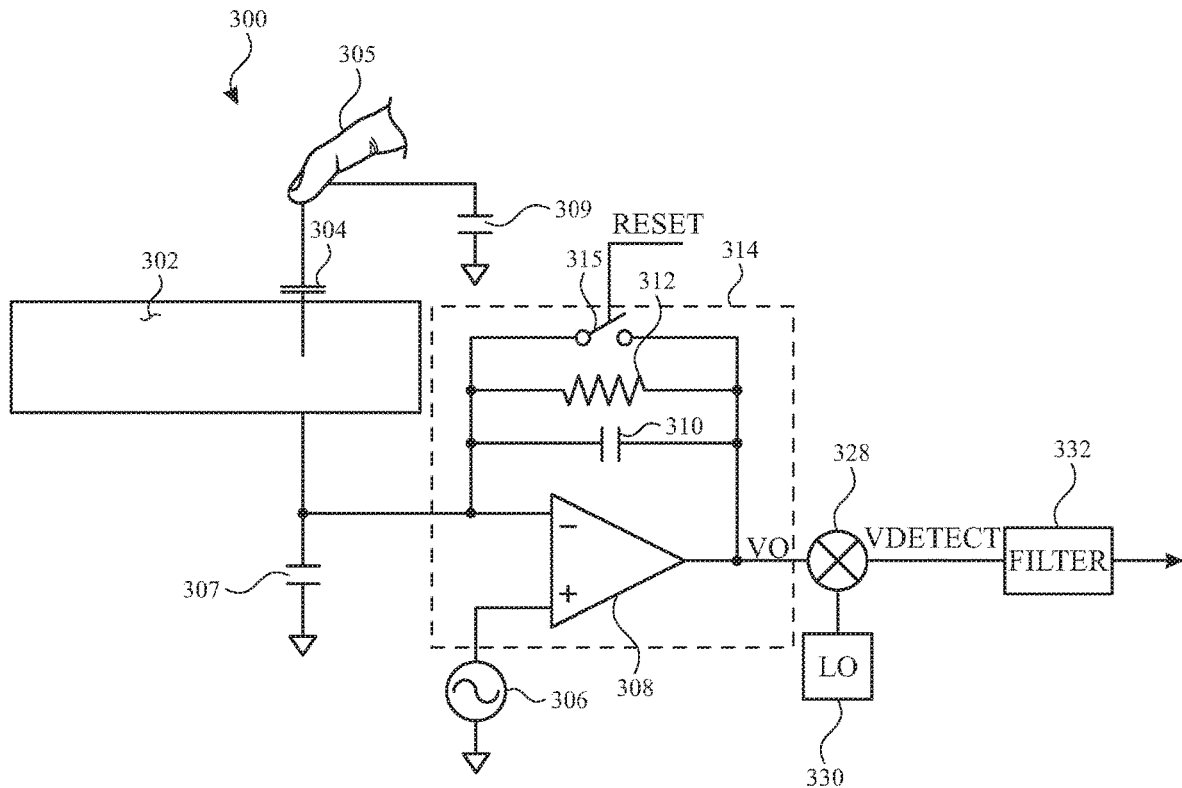
FIG. 3A illustrates a touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen/panel 400 or a touch node electrode 408 of touch screen/panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
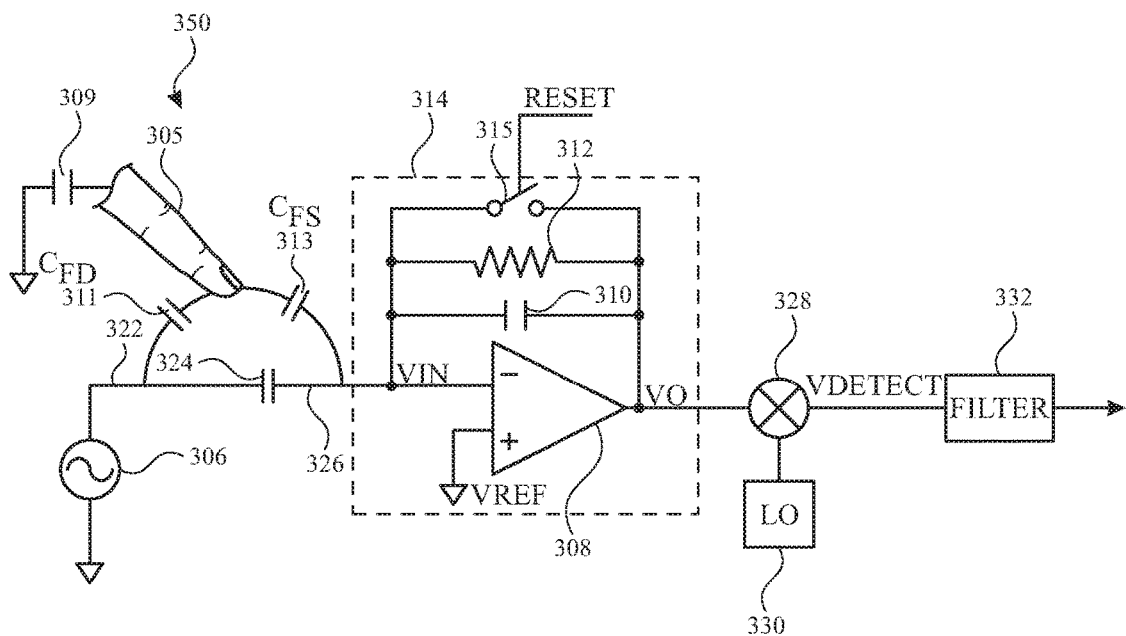
FIG. 3B illustrates a touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
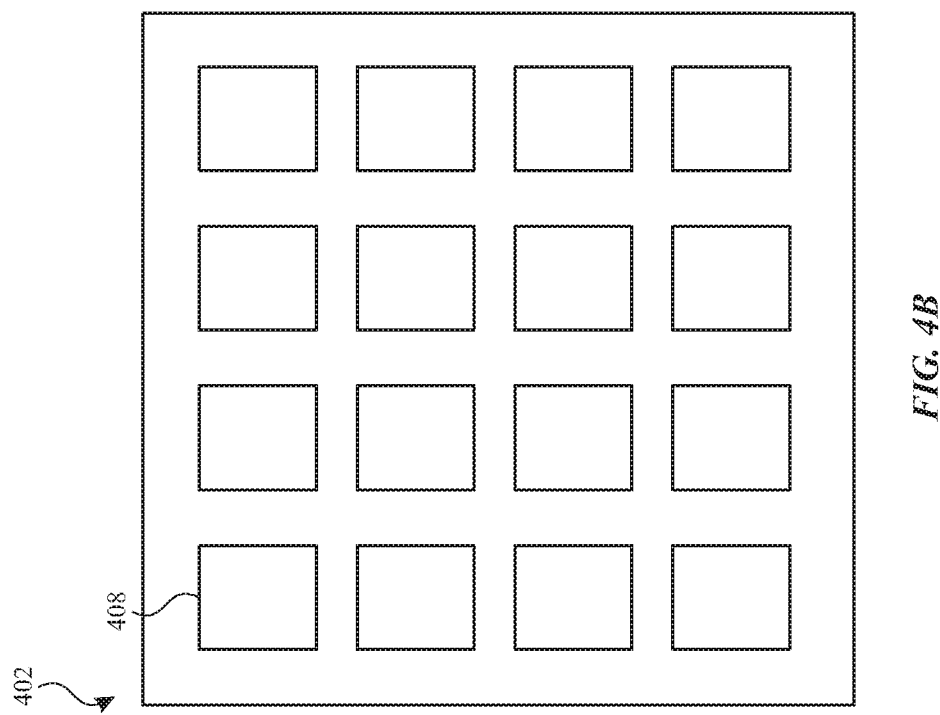
FIG. 4B illustrates a touch screen or touch sensor panel with touch node electrodes arranged in a pixelated touch node electrode configuration according to examples of the disclosure.
Figure 4A:
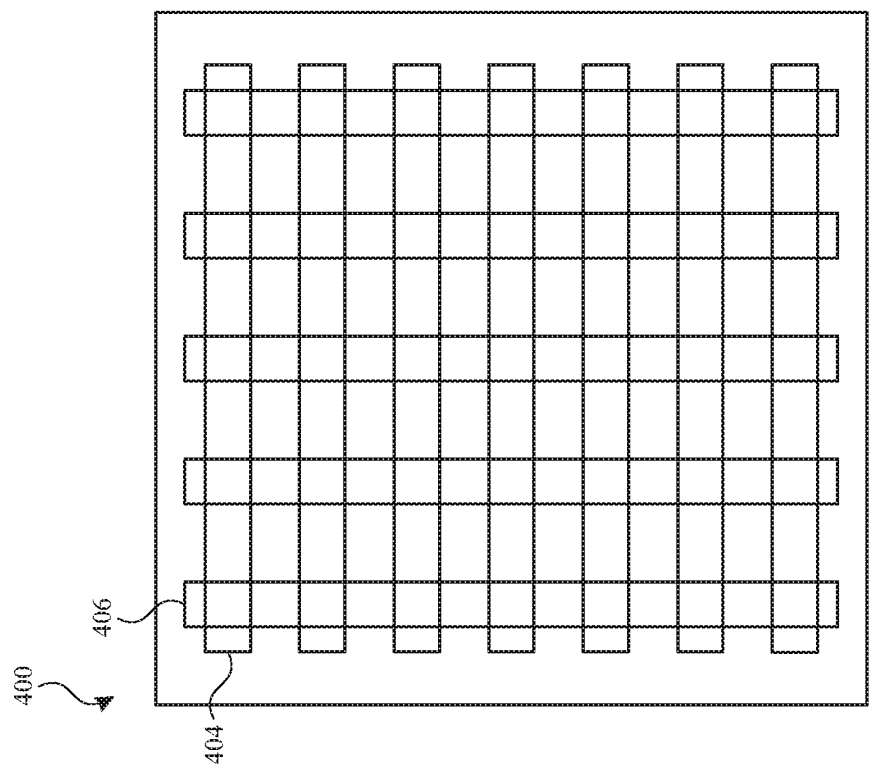
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch node electrodes 408 arranged in a pixelated touch node electrode configuration according to examples of the disclosure. Specifically, touch screen/panel 402 can include a plurality of individual touch node electrodes 408, each touch node electrode identifying or representing a unique location on the touch screen/panel at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen/panel 402. In some examples, touch screen/panel 402 can sense the self-capacitance of touch node electrodes 408 to detect touch and/or proximity activity on touch screen/panel 402, and in some examples, touch screen/panel 402 can sense the mutual capacitance between touch node electrodes 408 to detect touch and/or proximity activity on touch screen/panel 402.

As described herein, in some examples, a pixelated touch node electrode configuration can be implemented in a touch screen. FIG. 5 illustrates an example stack up for a touch screen using a pixelated touch node electrode configuration according to examples of the disclosure. Touch screen 500 can include a display, represented by data lines 502 in a columnar orientation (gate lines in a row orientation are not shown), and a touch sensor panel represented by touch electrodes 504 (e.g., corresponding to touch node electrodes 408). In some examples, a shield layer 506 can be disposed between the display and touch electrodes 504. In some examples, touch screen 500 can be an LCD touch screen with integrated touch electrodes (omitting shield layer 506). For example, the data lines 502 can be implemented in a TFT layer and the touch electrodes 504 can be implemented in a Vcom layer that can be used as ground electrodes for a display update and can be used as touch electrodes for a touch sensing operation. In some examples, touch screen 500 can include an OLED display (including display data lines 502 implemented in a TFT layer) and touch electrodes 504 disposed on the OLED display. Shield layer 506 can be disposed between the OLED display and touch electrodes 504. The shield layer 506 can be used as a cathode electrode (e.g., ground) for display updates and can be used for shielding the touch electrodes 506 from the display. It is understood that the stack up of touch screen 500 is a simplified stackup for illustration purposes, but that additional components and layers can be included in a stackup for a touch screen. Additionally, it is understood that the three data lines 502 and twelve touch electrodes 504 are representative, but that a touch screen can include additional data lines and touch electrodes depending on the size and resolution desired for the touch screen.

In some examples, due to the proximity of the display and the touch electrodes, the touch and/or display performance can be degraded. For example, driving touch electrodes can impact the signal on display data lines resulting in display artifacts that can be visible to the user. As another example, updating the display via gate lines and data lines (or otherwise changing display impedance) can capacitively couple to touch electrodes and can impact signal at touch nodes resulting in errors in touch detection. In some examples, touch sensing and display updating operations can be time-multiplex, but time-multiplexing may require more expensive circuitry (e.g., because circuitry must be faster to perform the touch and display operations in serial rather than in parallel). In some examples, performance of the touch screen can be improved using a bi-phase scan.

FIGS. 6A-6B illustrate locally guarded patterns for a bi-phase scan according to examples of the disclosure. Pattern 600 includes driving and sensing configurations for a center touch electrode 602 and four adjacent touch electrodes 604A-604D. Center touch electrode 602 can be driven with a first drive signal having a first phase and can be sensed (as indicated by label "D+/S" where D+ represents drive with the first drive signal and S represents sense). For example, center touch electrode 602 can be driven and sensed as described with reference to touch node electrode 302 coupled to sensing circuit 314 using an AC voltage source 306 generating the first drive signal. Adjacent touch electrodes 604A-604D can be driven with the first drive signal having the first phase (as indicated by label "D+"). For example, adjacent touch electrodes 604A-604D can be coupled to an AC voltage source generating the first drive signal (e.g., directly or via a sensing circuit like 314, but bypassing the feedback capacitor). Driving the adjacent touch electrodes 604A-604D can guard center touch electrode 602 and prevent or reduce modulation of the self-capacitance measured at center touch electrodes 602 (and thereby avoid errors in the measured self-capacitance due to parasitic coupling to adjacent touch electrodes) as compared with the modulation of the self-capacitance were the adjacent touch electrodes grounded. Pattern 610 includes driving and sensing configurations for a center touch electrode 612 and four adjacent touch electrodes 614A-614D. Center touch electrode 612 can be driven with a second drive signal having a second phase, different from the first phase, and can be sensed (as indicated by label "D−/S" where D− represents drive with the second drive signal and S represents sense). In some examples, the first phase can be 0° and the second phase can be 180° such that the second drive signal can be an inverse of the first drive signal. In some examples, the first phase and the second phase can be approximately 180° out of phase (e.g., within a threshold of 180° out of phase), with 180° of out phase providing for improved cancelation using the principles of the bi-phase scan because the first drive signals can be the inverse of the second drive signal. Despite having different phases, the first and second drive signals can have the same frequency and amplitude. Adjacent touch electrodes 614A-614D can be driven with the second drive signal having the second phase. Driving the adjacent touch electrodes 614A-614D can guard center touch electrode 612 and prevent or reduce modulation of the self-capacitance measured at center touch electrodes 612 (and thereby avoid errors in the measured self-capacitance due to parasitic coupling to adjacent touch electrodes) as compared with the modulation of the self-capacitance were the adjacent touch electrodes grounded.

As described herein, "adjacent touch electrodes" of a respective touch electrode (e.g., a sensed touch electrode) in the context of locally guarded patterns can include one or two touch electrodes on a first axis and one or two of the touch electrodes on a second axis, different from (e.g., orthogonal to) the first axis, without intervening touch electrodes between the adjacent touch electrodes and the respective touch electrode. For example, the first axis can be the y-axis including an adjacent touch electrode 604A (adjacent, above) and/or adjacent touch electrode 604C (adjacent, below) next to center touch electrode 602, without any intervening touch electrodes between touch electrode 604A and center touch electrode 602 and without intervening touch electrodes between touch electrode 604C and center touch electrode 602. The second axis can be the x-axis including an adjacent touch electrode 604B (adjacent, right) and/or adjacent touch electrode 604D (adjacent, left) next to center touch electrode 602, without any intervening touch electrodes between touch electrode 604B and center touch electrode 602 and without intervening touch electrodes between touch electrode 604D and center touch electrode 602.

Thus, for patterns 600 and 610, a center touch node can generally be guarded by four adjacent touch electrodes. However, it should be understood that along edges of the touch sensor panel, a sensed touch electrode may be guarded by fewer adjacent touch electrodes (e.g., three adjacent touch electrodes). For example, a sensed touch electrode along a left edge of a touch sensor panel may have an adjacent touch electrode to the right, above, and below. In a similar manner, a sensed touch electrode along a right edge of a touch sensor panel may have an adjacent touch electrode to the left, above, and below, a sensed touch electrode along a top edge of a touch sensor panel may have an adjacent touch electrode to the left, right, and below, and a sensed touch electrode along a bottom edge of a touch sensor panel may have an adjacent touch electrode to the left, right, and above. A sensed touch electrode at a corner of the touch sensor panel, can have two adjacent touch electrodes.

Figure 7A:
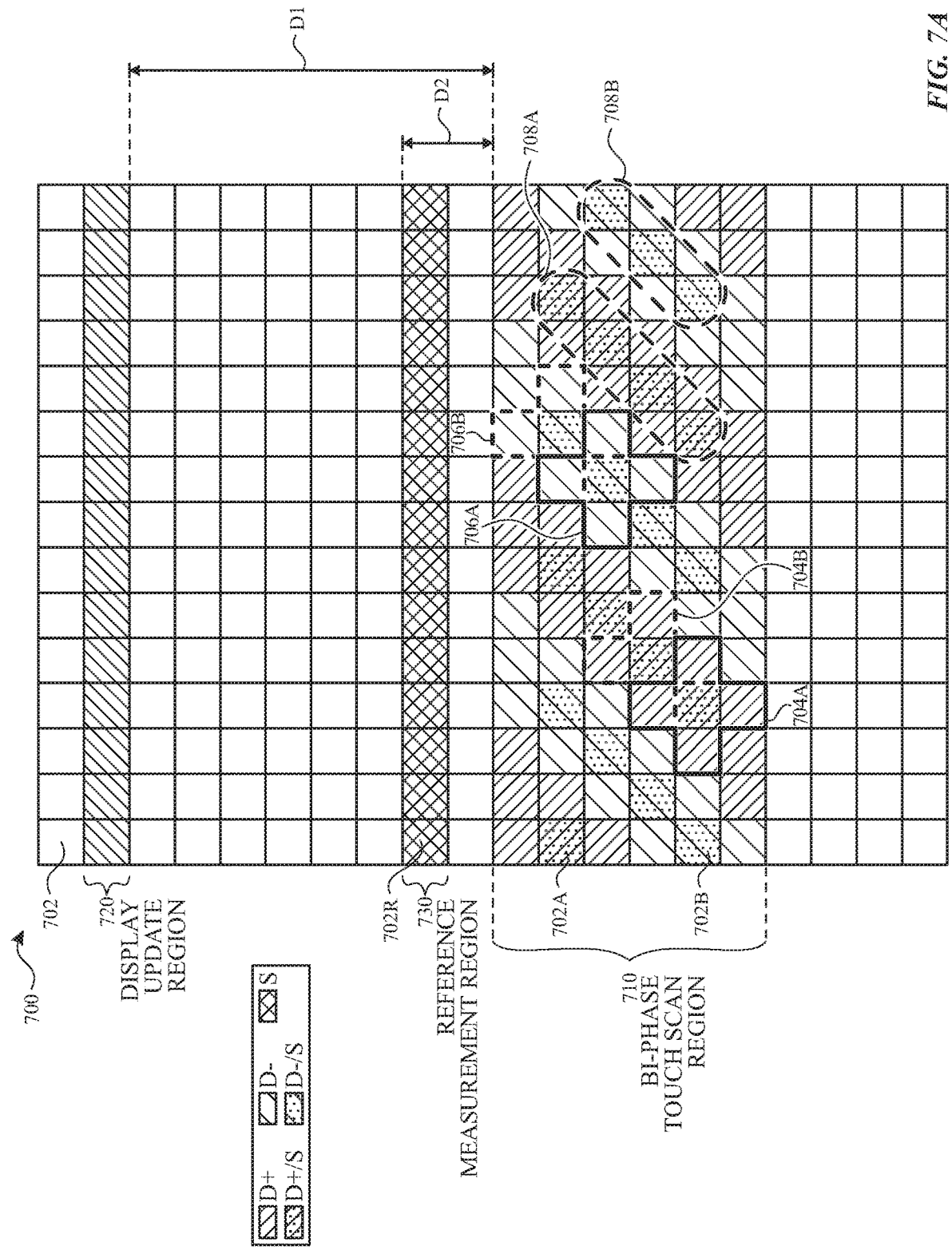
FIGS. 7A-7B illustrate example bi-phase touch scans for a region of a touch screen using repetitions of locally guarded patterns according to examples of the disclosure.
Figure 7B:
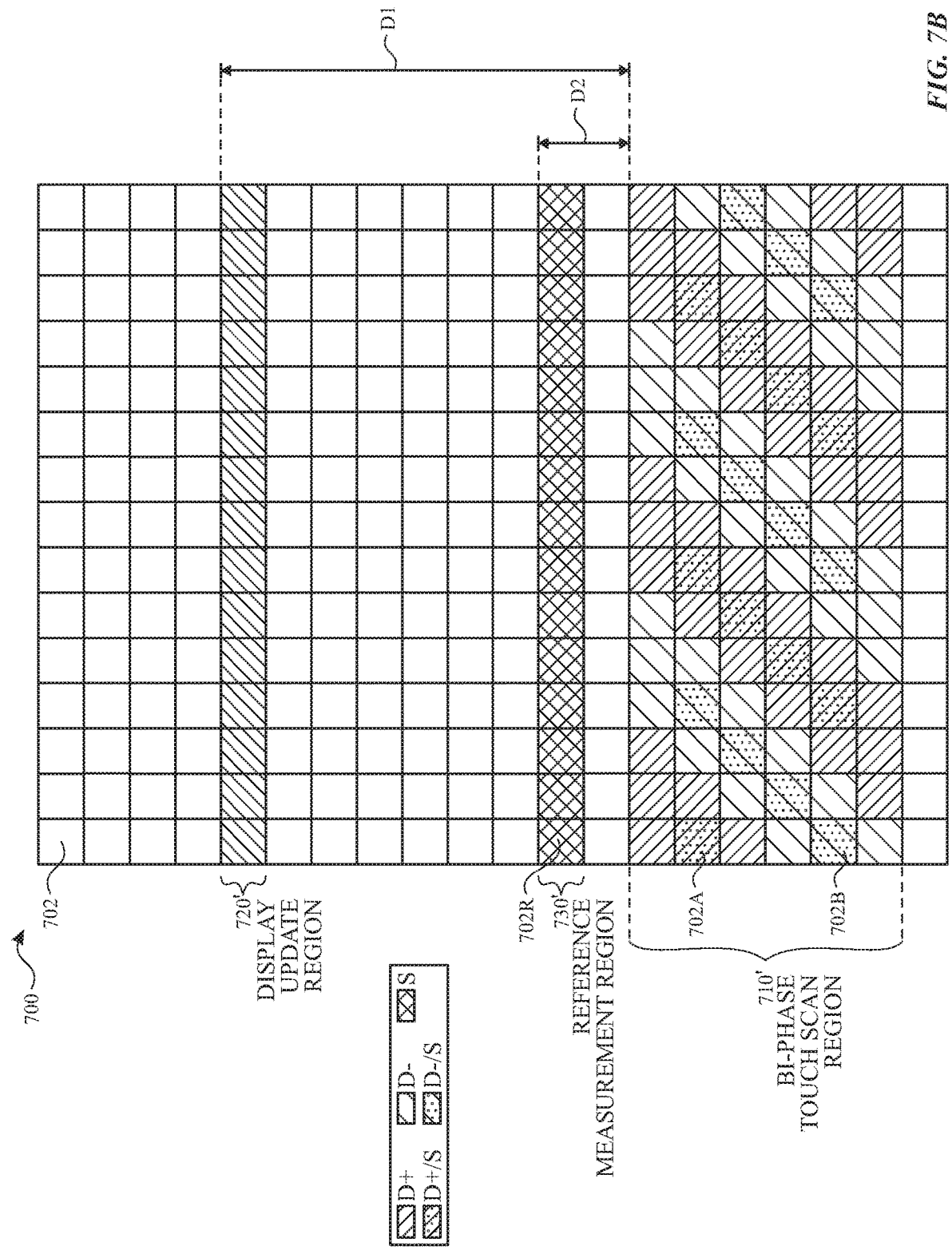
Figure 8:
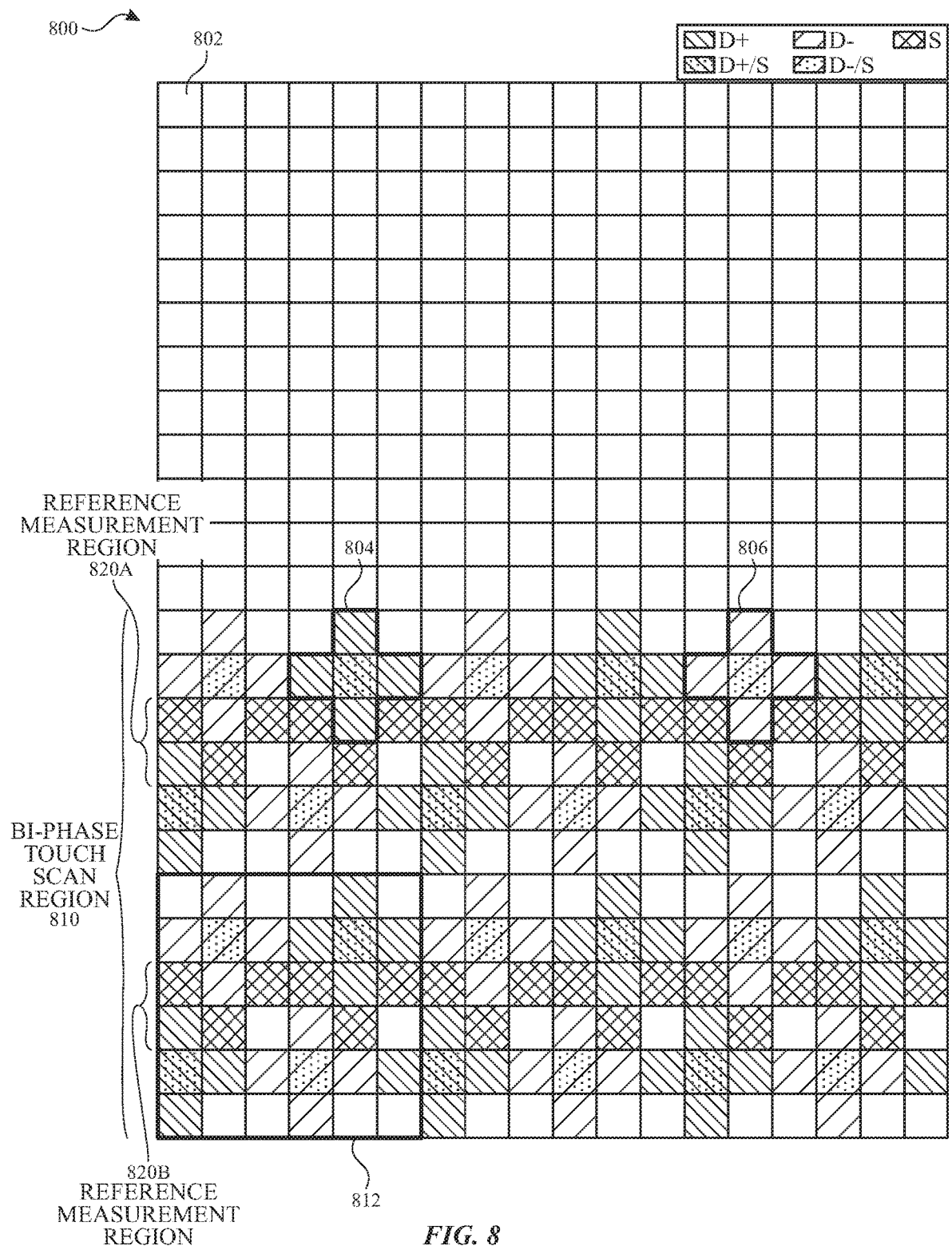
FIG. 8 illustrates an example bi-phase touch scan for a region of a touch screen using repetitions of locally guarded patterns according to examples of the disclosure.

Driving and sensing configurations for a bi-phase touch scan can be constructed using repetitions of patterns 600 and 610. FIGS. 7A-7B and FIG. 8 illustrate example bi-phase touch scans for a region of a touch screen using repetitions of locally guarded patterns according to examples of the disclosure. FIG. 7A illustrates a touch screen 700 including an array of touch electrodes 702. It is understood that the array can be bigger or smaller than the 20×15 array of FIG. 7A. A bi-phase touch scan can be performed in bi-phase touch scan region 710 of touch screen 700. The bi-phase scan can include driving a first plurality of the touch electrodes with a first drive signal with a first phase (touch electrodes including labels D+ or D+/S) and driving a second plurality of the touch electrodes with a second drive signal with a second phase different than the first phase (touch electrodes including labels D- or D-/S). The driving of the first plurality of the touch electrodes and the second plurality of the touch electrodes can be concurrent. A subset of the first plurality of touch electrodes can be sensed (e.g., touch electrodes with labels D+/S), and a subset of the second plurality of touch electrodes can be sensed (e.g., touch electrodes with labels D-/S). Sensing the subset of the first plurality of the touch electrodes and the subset of the second plurality of the touch electrodes can be concurrent.

The bi-phase touch scan of FIG. 7A uses patterns 600 and 610 of FIGS. 6A-6B. For example, patterns 704A and 704B correspond to repetitions of pattern 600 and patterns 706A and 706B corresponding to repetitions of pattern 610. Patterns 704A-704B and patterns 706A-706B partially overlap such that eight touch electrodes can be used to perform locally guarded driving and sensing of two center touch electrodes (compared with ten touch electrodes that can be used to perform locally guarded driving and sensing of two center touch electrodes without overlapping patterns). Each of the sensed center touch electrodes (labeled D+/S or D-/S) can have its adjacent touch electrodes driven with the same drive signal (D+ or D-) as applied to the sensed center touch nodes. In the example bi-phase touch scan of FIG. 7A, the subset of the first plurality of electrodes and the subset of the second plurality of electrodes are arranged along diagonals. For example, bi-phase touch scan region 710 includes sensing of touch electrodes labeled D+/S along diagonal 708A (four consecutive touch electrodes along the diagonal) and touch electrodes D-/S along diagonal 708B (three consecutive touch electrodes along the diagonal). Additional groups of touch electrodes labeled D+/S or D-/S are arranged in diagonals (e.g., including touch electrodes arranged in diagonals through patterns 704A-704B and through patterns 706A-706B).

The patterns used for the bi-phase touch scan of FIG. 7A can balance charge. In particular, along a first axis (e.g., columns) an equal number of touch electrodes can be driven with the first drive signal (D+) as can be driven with the second drive signal (D-) that can be an inverse of the first drive signal. For example, in FIG. 7A, each column includes three touch electrodes driven by the first drive signal and three touch electrodes driven by the second drive signals. As a result of having the same number of touch electrodes driven with opposite phase drive signals, the net charge along the first axis (e.g., along each of the columns) can be zero. In some examples, the data lines of the display can be oriented along the same first axis. As a result, balancing the charge can mitigate the impact of touch sensing operations on the display operation (e.g., reducing or eliminating display artifacts).

In some examples, while performing the bi-phase touch scan in the bi-phase touch scan region 710, touch screen 700 can concurrently update a portion of the display in a different region. For example, FIG. 7A illustrates touch screen 700 updating the display row(s) in display update region 720. To avoid interaction between the display update operation and the bi-phase touch scan, the bi-phase touch scan region 710 and the display update region 720 of the touch screen can be separated by a threshold distance. For example, the bi-phase touch scan region 710 and the display update region 720 can be separated by at least a threshold distance D1. Spatially multiplexing the touch and display operations by spacing the touch and display regions by a threshold distance—and using a bi-phase touch scan—can thereby reduce touch and display interference without the need for time-multiplexing (and without the need for higher speed touch and display circuitry required for time-multiplexing). During touch and display operations by touch screen 700, the minimum separation between the display region being updated and the bi-phase touch scan region being scanned can be maintained.

FIG. 7A illustrates a scan step sensing some touch electrodes in bi-phase touch scan region 710. In some examples, the driving and sensing pattern shown in FIG. 7A can be shifted to sense additional touch electrodes. In some examples, the driving and sensing pattern of FIG. 7A can be shifted to sense additional touch electrodes in the bi-phase touch scan region 710. For example, shifting the driving and sensing pattern right during a subsequent scan step (and wrapping around to the touch screen), and then shifting the driving and sensing pattern right again during another subsequent scan step (again wrapping around the touch screen), can result in touch screen 700 sensing all of the touch electrodes in the rows including and between touch electrodes 702A and 702B. Although a rightward shift is described above, in some examples, a leftward shift can be used.

Additionally or alternatively, the driving and sensing pattern shown in FIG. 7A can be shifted downward (or upward) to measure other regions of touch screen 700. FIG. 7B illustrates a touch screen 700 including an array of touch electrodes 702 as in FIG. 7A. Like FIG. 7A, a bi-phase touch scan can be performed in bi-phase touch scan region 710' of touch screen 700 that is offset downward relative to bi-phase touch scan region 710 of FIG. 7A, but using the same patterns/repetitions of patterns 600 and 610 (the details of which are not repeated here for brevity). The bi-phase scan can include concurrently driving a third plurality of the touch electrodes with the first drive signal with the first phase (touch electrodes including labels D+ or D+/S) and driving a fourth plurality of the touch electrodes with the second drive signal with the second phase different than the first phase (touch electrodes including labels D− or D−/S). A subset of the third plurality of touch electrodes (e.g., touch electrodes with labels D+/S) and a subset of the fourth plurality of touch electrodes (e.g., touch electrodes with labels D−/S) can be concurrently sensed.

In some examples, while performing the bi-phase touch scan in the bi-phase touch scan region 710', touch screen 700 can concurrently update a portion of the display in a different region. For example, FIG. 7B illustrates touch screen 700 updating the display row(s) in display update region 720', offset relative to display update region 720 of FIG. 7A, but still separated by at least threshold distance D1. During touch and display operations by the touch screen, bi-phase touch scan region and the display update region can be offset in multiple scan and display steps to enable updating the entire display and scanning the touch electrodes to generate a touch image for touch screen 700.

In some examples, to further reduce interaction between the touch and display systems of the touch screen, reference measurements can performed concurrently with the measurement of sensed touch electrodes during the bi-phase touch scan. The reference measurements can be used to measure noise on the touch electrodes, including noise induced by updating the display (e.g., from transitions of the data lines). For example, FIGS. 7A and 7B illustrate a reference measurement region 730 and offset reference measurement region 730'. Some or all of the touch electrodes in the reference measurement regions 730 or 730' can be sensed without being driven (labeled "S") concurrently with driving and sensing the touch electrodes in bi-phase touch scan region 710 or 710'. Sensing touch electrodes in the reference measurement region can allow for measuring noise from the display lines coupling to the touch electrodes 702. The reference measurements indicative of display noise coupling to the touch electrodes can be subtracted from measurements of sensed touch electrodes in the bi-phase touch scan region. In some examples, the reference measurements and subtraction can be performed along a first axis corresponding to the display lines. For example, the measurement and subtraction can be done on a per-column basis. For example, touch electrode 702R in reference measurement region 730 (or 730') can measure noise from the data line(s) coupling to touch electrodes in the first column as a touch value (touch signal), and that touch value can be subtracted from touch values (touch signals) resulting from measuring touch electrodes 702A and 702B in the same column. In a similar manner, touch values from respective touch electrodes in the reference measurement region 730 can be subtracted from touch values from respective sensed touch electrodes in the same column. Thus, use of reference touch electrodes can reduce display to touch noise because common mode display noise can be measured on the reference touch electrodes and then subtracted from the touch measurements of the sensed touch electrodes (e.g., on the column corresponding to the data line(s)).

In some examples, the reference measurement region can be within a threshold distance D2 of bi-phase touch scan region 710. In some examples, the reference measurement region can measure a row of touch electrodes adjacent to the bi-phase touch scan region. In some examples, the reference measurement region can be separated by one or more rows of touch electrodes adjacent to the bi-phase touch scan region (e.g., one row is shown in FIGS. 7A-7B). Measuring within a threshold distance can avoid the reference measurement including noise from other sources that do not impact the touch electrodes in the bi-phase touch scan region. Measuring with some separation between the reference measurement region and the bi-phase touch scan region can avoid subtracting some touch signal that may couple to the reference touch electrodes from an object in proximity to the reference measurement region and/or to the bi-phase touch scan region.

Although the reference measurement region 730 (or 730') is shown as a single row above the bi-phase touch scan region 710 (or 710') it should be understood that other arrangements of touch electrodes in a reference measurement region are possible. For example, reference region 730 can be a first reference measurement region used to subtract touch values representative of noise from touch values from sensing locally guarded touch electrodes in the top half of bi-phase touch scan region 710, and a second reference measurement region (not shown) can be mirrored on the opposite side of bi-phase touch scan region 710, and touch values representative of noise from the second reference measurement region can be subtracted from touch values from sensing locally guarded touch electrodes in the bottom half of bi-phase touch scan region 710 (e.g., on a per-column basis). In some examples, the measurements from the first reference measurement region and the second reference measurement region can be averaged (on a per-column basis) and the average touch value representative of noise can be subtracted from the touch values from sensing locally guarded touch electrodes in the bi-phase touch scan region 710. In some examples, the touch electrodes in the reference measurement region can be distributed in multiple rows rather than in a single row as shown in FIGS. 7A-7B.

In some examples, the subtraction described above using touch values from reference touch nodes in a reference measurement region can be performed in a digital domain. For example, the sense circuitry (e.g., circuitry of FIG. 3A) used to sensed touch electrodes in the bi-phase touch scan region can output an analog value and the analog value can be digitized (e.g., using an ADC). In a similar manner, the sense circuitry used to sense reference touch electrodes (e.g., similar to circuitry of FIG. 3A, but without AC stimulation) can output an analog value that can be digitized. The subtraction can be done in the digital domain using the digitized outputs of the sense circuitry for sensed touch electrodes and reference electrodes. In some examples, the subtraction described above can be performed in an analog domain. For example, the current from the reference touch electrodes can be subtracted from the currents measured by sensed touch electrodes in the bi-phase touch scan region. For example, an analog circuit can measure current from the reference touch electrodes and the current can be subtracted from the input current of the sense circuitry measuring the sensed locally guarded touch electrodes in the bi-phase touch scan region.

Although, FIGS. 7A-7B illustrate bi-phase touch scans for a region of a touch screen using repetitions of locally guarded patterns of FIGS. 6A-6B, it is understood that a bi-phase touch scan can be performed, in some examples, without using local guarding. Locally guarding provides improved cancelation of parasitic capacitance (and therefore less touch signal distortion), but requires additional scan steps (and therefore power) to sense the capacitance at each of the touch electrodes in a given bi-phase scan region. Thus, in some examples, a non-locally guarded bi-phase touch scan can be used to reduce power consumption (e.g., where the distortion levels may be acceptable for the touch screen). In some examples, the touch screen can switch between locally guarded and non-locally guarded bi-phase touch scans (e.g., depending on power levels, signal-to-noise conditions of the touch system, etc.). For example, non-locally guarded bi-phase touch scans can be used when the device is in a low-power mode (or when battery level is less than a threshold or when SNR of the touch system is above a threshold), whereas locally guarded bi-phase touch scans can be used when the device is not in the low-power mode (or when battery is above the threshold or when SNR of the touch system is below a threshold).

Figure 7C:
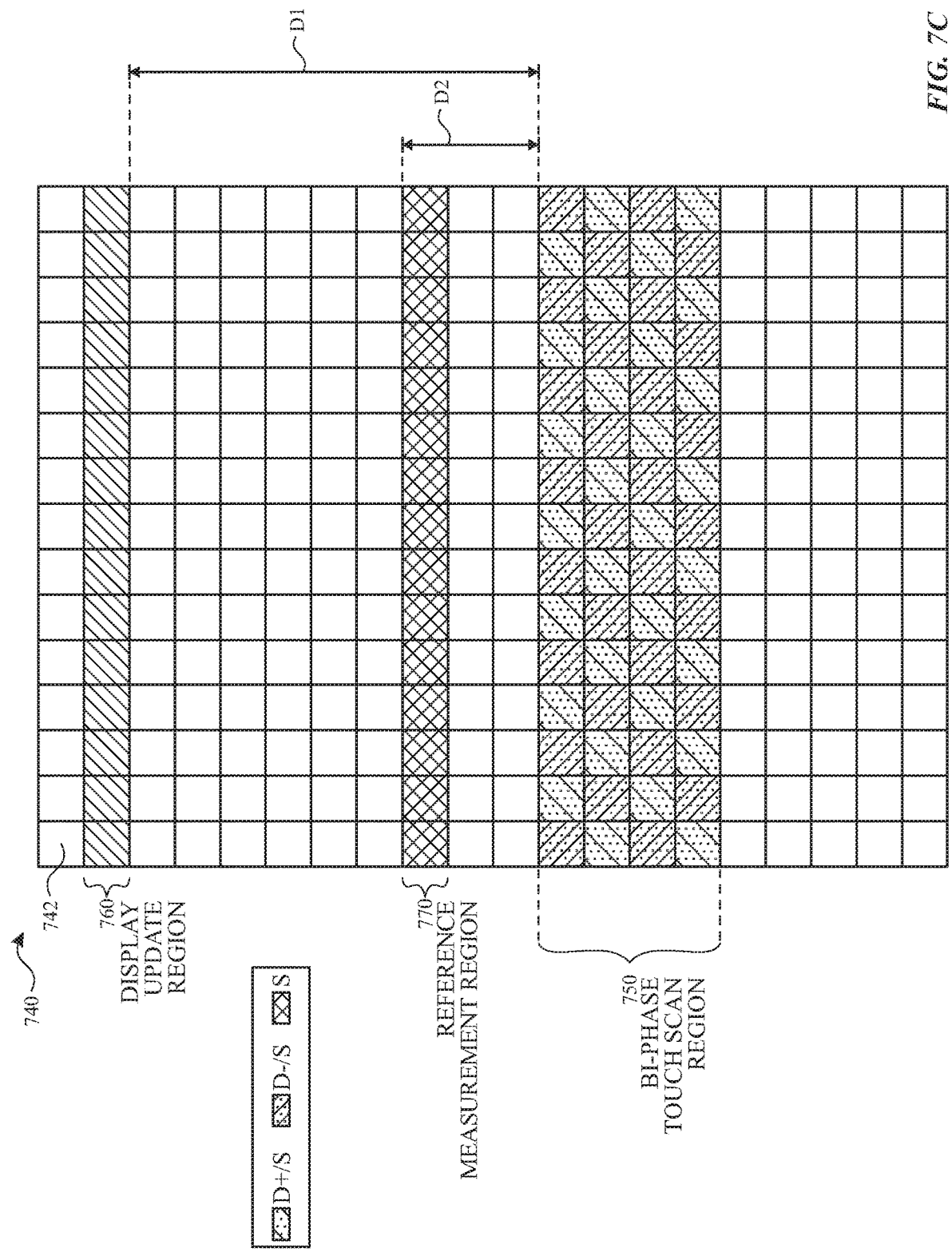
FIG. 7C illustrates an example bi-phase touch scan for a region of a touch screen without local guarding according to examples of the disclosure.

FIG. 7C illustrates an example bi-phase touch scan for a region of a touch screen without local guarding according to examples of the disclosure. FIG. 7C illustrates a touch screen 740 including an array of touch electrodes 742 corresponding to touch screen 700 and touch electrodes 702. A bi-phase touch scan can be performed in bi-phase touch scan region 750 include driving a first plurality of the touch electrodes with a first drive signal with a first phase (touch electrodes labeled D+/S) and driving a second plurality of the touch electrodes with a second drive signal with a second phase different than the first phase (touch electrodes labeled D−/S).

The patterns used for the bi-phase touch scan of FIG. 7C can balance charge along a first axis (e.g., columns). For example, in FIG. 7C, each column of touch electrodes can include two electrodes driven by the first drive signal and two touch electrodes driven by the second drive signal. As a result of having the same number of touch electrodes driven with opposite phase drive signals, the net charge per column can be zero. As a result, balancing the charge in each column can mitigate the impact of touch sensing operations on the display operation (e.g., reducing or eliminating display artifacts).

In some examples, while performing the bi-phase touch scan in the bi-phase touch scan region 750, touch screen 740 can concurrently update a portion of the display in display update region 760 (e.g., a different region a threshold distance away from the bi-phase touch scan region) in a similar manner as described above with respect to FIGS. 7A-7B and not repeated here for brevity. In some examples, during touch and display operations by touch screen 740, the bi-phase touch scan region and the display update region can be offset in different touch scan steps or display update steps to enable updating the entire display and scanning the touch electrodes to generate a touch image for touch screen 740.

In some examples, to further reduce interaction between the touch and display systems of touch screen 740, reference measurements can performed in reference measurement region 770 concurrently with the measurement during the bi-phased touch scan in a similar manner as described above with respect to FIGS. 7A-7B and not repeated here for brevity.

FIG. 8 illustrates a touch screen 800 including an array of touch electrodes 802. It is understood that the array can be bigger or smaller than the 24×18 array of FIG. 8. A bi-phase touch scan can be performed in bi-phase touch scan region 810 of touch screen 800. The bi-phase scan can include driving a first plurality of the touch electrodes with a first drive signal with a first phase (touch electrodes including labels D+ or D+/S) and driving a second plurality of the touch electrodes with a second drive signal with a second phase different than the first phase (touch electrodes including labels D− or D−/S). The driving of the first plurality of the touch electrodes and the second plurality of the touch electrodes can be concurrent. A subset of the first plurality of touch electrodes can be sensed (e.g., touch electrodes with labels D+/S), and a subset of the second plurality of touch electrodes can be sensed (e.g., touch electrodes with labels D−/S). Sensing the subset of the first plurality of the touch electrodes and the subset of the second plurality of the touch electrodes can be concurrent.

The bi-phase touch scan of FIG. 8 also uses patterns 600 and 610 of FIGS. 6A-6B. For example, pattern 804 corresponds to pattern 600 and pattern 806 corresponds to pattern 610. However, unlike in FIGS. 7A-7B that use interlocking and partially overlapping repetitions of patterns 600 and 610, patterns 600 and 610 in FIG. 8 are non-overlapping (e.g., ten touch electrodes can be used to perform locally guarded drive and sense of two center touch electrodes) and non-interlocking (e.g., the bi-phase touch scan region includes touch electrodes that are floating, grounded or otherwise driven with a DC potential between locally guarded patterns). In the example of FIG. 8A, the driving and sensing arrangement alternates between patterns 804 and 806.

The patterns used for the bi-phase touch scan of FIG. 8 can balance charge. However, unlike the patterns used for the bi-phase touch scan of FIG. 7A, the balance of charge can be achieved in a localized region rather than along a first axis (e.g., columns). For example, in FIG. 8, localized region 812 including a six-by-six region of touch electrodes includes ten touch electrodes driven by the first drive signal and ten touch electrodes driven by the second drive signals. As a result of having the same number of touch electrodes driven with opposite phase drive signals, the net charge in localized region 812 can be zero. In some examples, shield layer 506 between the data lines of the display and the touch electrode can diffuse charge that can allow for localized charge balance to reduce noise without requiring stricter per-axis charge balance. As a result, balancing the charge in the localized region can mitigate the impact of touch sensing operations on the display operation (e.g., reducing or eliminating display artifacts). The charge can be similarly balanced for other regions of six-by-six touch electrodes in the bi-phase touch scan region 810. It should be understood that although a region of six-by-six touch electrodes is described, that the localized region may be of a different size (e.g., smaller or larger). The size of the region may be a function of the sheet resistance and/or capacitive loading of the various layers of the touch screen (e.g., the touch electrodes, shield layer, display lines, etc.). In some examples, the size of the region can be a tradeoff between size and cancellation efficiency, where balancing the drive signals in a smaller region can correspond to improved cancelation efficiency (e.g., closer to a net zero).

In some examples, while performing the bi-phase touch scan in the bi-phase touch scan region 810, touch screen 800 can concurrently update a portion of the display in a different region (e.g., a threshold distance away) in a similar manner as described above with respect to FIGS. 7A-7B and not repeated here for brevity. Additionally, the driving and sensing pattern shown in FIG. 8 can be shifted (e.g., right, left, up or down) to sense additional touch electrodes in a similar manner as described with respect to FIGS. 7A-7B and not repeated here for brevity. In some examples, during touch and display operations by touch screen 800, the bi-phase touch scan region and the display update region can be offset in different touch scan steps or display update steps to enable updating the entire display and scanning the touch electrodes to generate a touch image for touch screen 800.

In some examples, to further reduce interaction between the touch and display systems of touch screen 800, reference measurements can performed concurrently with the measurement during the bi-phased touch scan in a similar manner as described above with respect to FIGS. 7A-7B and not repeated here for brevity. In some examples, because the driving and sensing configurations of the pattern of FIG. 8 provides touch electrodes that are not stimulated with the first or second drive signals, the reference touch electrodes can be disposed within the bi-phase touch scan region such that the reference measurement region at least partially overlaps the bi-phase touch scan region. For example, FIG. 8 shows a first reference measurement region 820A including reference touch electrodes (labeled "S") that can be used to subtract touch values representative of common mode display noise from touch values measured from sensed locally guarded touch electrodes in the top half of bi-phase touch scan region 810, and a second reference measurement region 820B including reference touch electrodes (labeled "S") that can be used to subtract touch values representative of common mode display noise from touch values measured from sensed locally guarded touch electrodes in the bottom half of bi-phase touch scan region 810 (e.g., on a per-column basis). In some examples, the measurements from the first reference measurement region and the second reference measurement region can be averaged (e.g., on a per-column basis) and the average touch value representative of noise can be subtracted from the touch values measured from sensed locally guarded touch electrodes in the bi-phase touch scan region 810. It should be understood that the distribution of reference touch electrodes in FIG. 8 is exemplary and that fewer reference touch electrodes or more or different distributions of reference touch electrodes are possible within and/or outside of bi-phase touch scan region 810.

It should be understood that the driving and sensing configurations of the pattern for the bi-phase scan of FIG. 7A-7B achieves per-axis (e.g., per-column) charge balancing and can be used to mitigate noise for touch screens with or without shield layer 506 (e.g., for both OLED and LCD based touch screens). However, the driving and sensing configurations of the pattern of FIG. 8 may be used to mitigate noise for touch screens including shield layer 506, and may also mitigate noise (but to a lesser extent) for touch screens that do not include shield layer 506. Additionally, it should be understood that the driving and sensing configurations of the patterns of FIGS. 7A-8 are representative bi-phase touch scans using patterns 600 and 610, but that other driving and sensing configurations/patterns are possible using patterns 600 and 610 to implement locally guarded bi-phase touch scans, optionally with per-column and/or per-localized region charge balancing.

Figure 9:
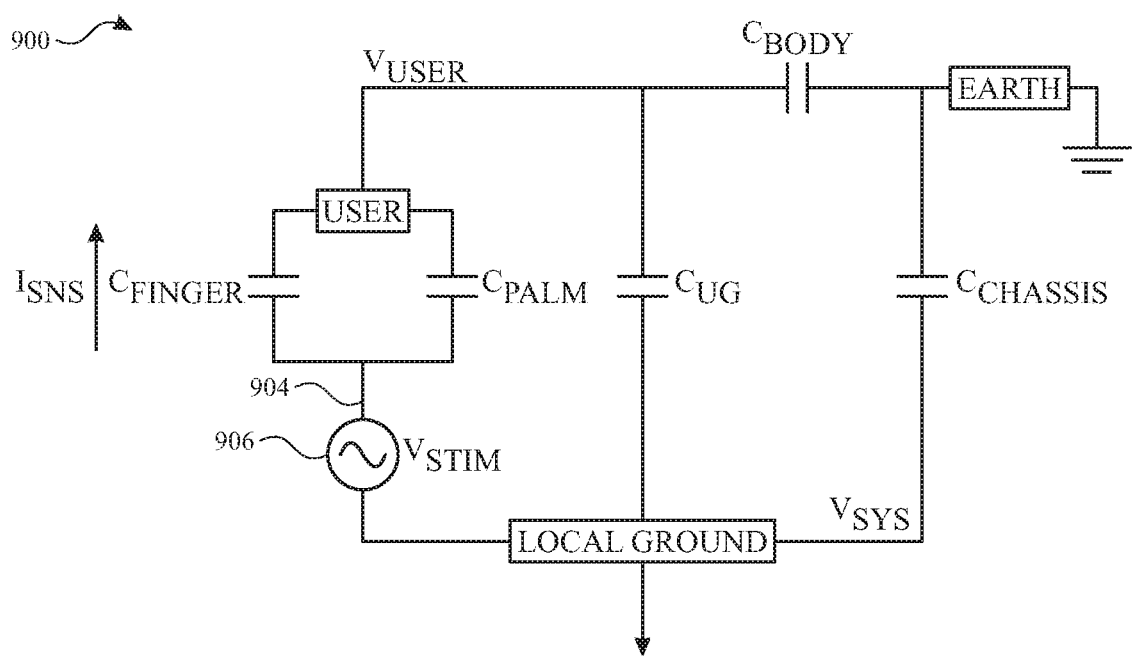
FIG. 9 illustrates an example circuit representation of poor grounding conditions according to examples of the disclosure.

In some examples, a bi-phase touch scan can reduce the impact of poor grounding conditions. FIG. 9 illustrates an example circuit representation of poor grounding conditions according to examples of the disclosure. In particular, circuit representation 900 includes a node representing the user, a node representing earth ground and a node representing local ground of a touch screen device. The touch screen device can include touch electrodes 904 driven by drive source 906 referenced to the local ground. The user couples to earth ground via a capacitance $C_{body}$ and the touch screen device couples to earth ground via capacitance $C_{chassis}$. The chassis of the touch screen device can be at local ground. The user can couple to the device via capacitance $C_{finger}$ representing capacitive coupling between a finger and touch electrodes 904 of the touch screen, capacitance $C_{palm}$ representing capacitive coupling between a palm (or other large contact) and touch electrodes 904 of the touch screen, and a stray capacitance $C_{ug}$ representing capacitance between the user and the local ground of the touch screen device when the user is "ungrounded" or poorly grounded such that a high-impedance path exists between the user and the touch screen device, such as when the device rests on a non-conductive surface (e.g., a wooden tabletop). Under some grounding conditions, such as when a user is holding the chassis of the device in the user's hand, a low-impedance path between the user and the local ground of the touch screen device can be formed that effectively bypasses stray capacitance $C_{ug}$. Unless otherwise specified, it should be understood that high-impedance and low-impedance pathways are relative terms (e.g., the high-impedance path has a higher impedance than the low impedance path).

Stray capacitance $C_{ug}$ can represent a parasitic capacitance that reduces the full-scale touch signals measured by the touch screen in the presence of a finger and a palm. For example, if some or all of the touch electrodes of a touch sensor panel are driven with the same phase drive signal from the drive source 906 (e.g., no bi-phase stimulation), relatively large currents can be generated in response to the presence of $C_{finger}$ and $C_{palm}$ in contact with or proximity to the driven touch electrodes. However, stray capacitance $C_{ug}$ has limited ability to sink the currents due to $C_{finger}$ and $C_{palm}$ to local ground (e.g., as compared with a user grounded to the device via a low-impedance path) due to the high-impedance path. As a result, the current due to the finger, $I_{sns}$ (e.g., a quantity of interest for touch sensing) can have a reduction in amplitude of 15%-90% depending on the number of touch electrodes concurrently driven and the size of the palm contact. In particular, a fully guarded touch scan (e.g., driving all of the touch electrodes with the same drive signal concurrently) can reduce the current due to the finger by 75% or more. A reduced current translates into a reduced touch signal (and thereby reduced SNR), which can degrade touch performance (e.g., because smaller touch signals may be harder to distinguish from noise and/or because the smaller touch signals may not meet the touch detection threshold).

In some examples, the bi-phase scan described herein can improve touch performance. For example, the bi-phase touch scan of FIGS. 7A-7B or FIG. 8 can stimulate the touch electrodes with opposite phase drive signals, optionally fully charge balanced, that can provide lower net charge and current flow (optionally a net charge at or within a threshold of zero). As a result, $C_{ug}$ sinks less current and the current due to the finger can be detected at or within a threshold of full-scale (e.g., the current level/touch signal level when a low-impedance path exists between the user and local ground). For example, the current due to the finger can be reduced by 10% or less (e.g., between 0.5-5%) even when a high-impedance path rather than a low-impedance path exists between a user and the touch screen device (e.g., even under poor grounding condition).

Figure 10:
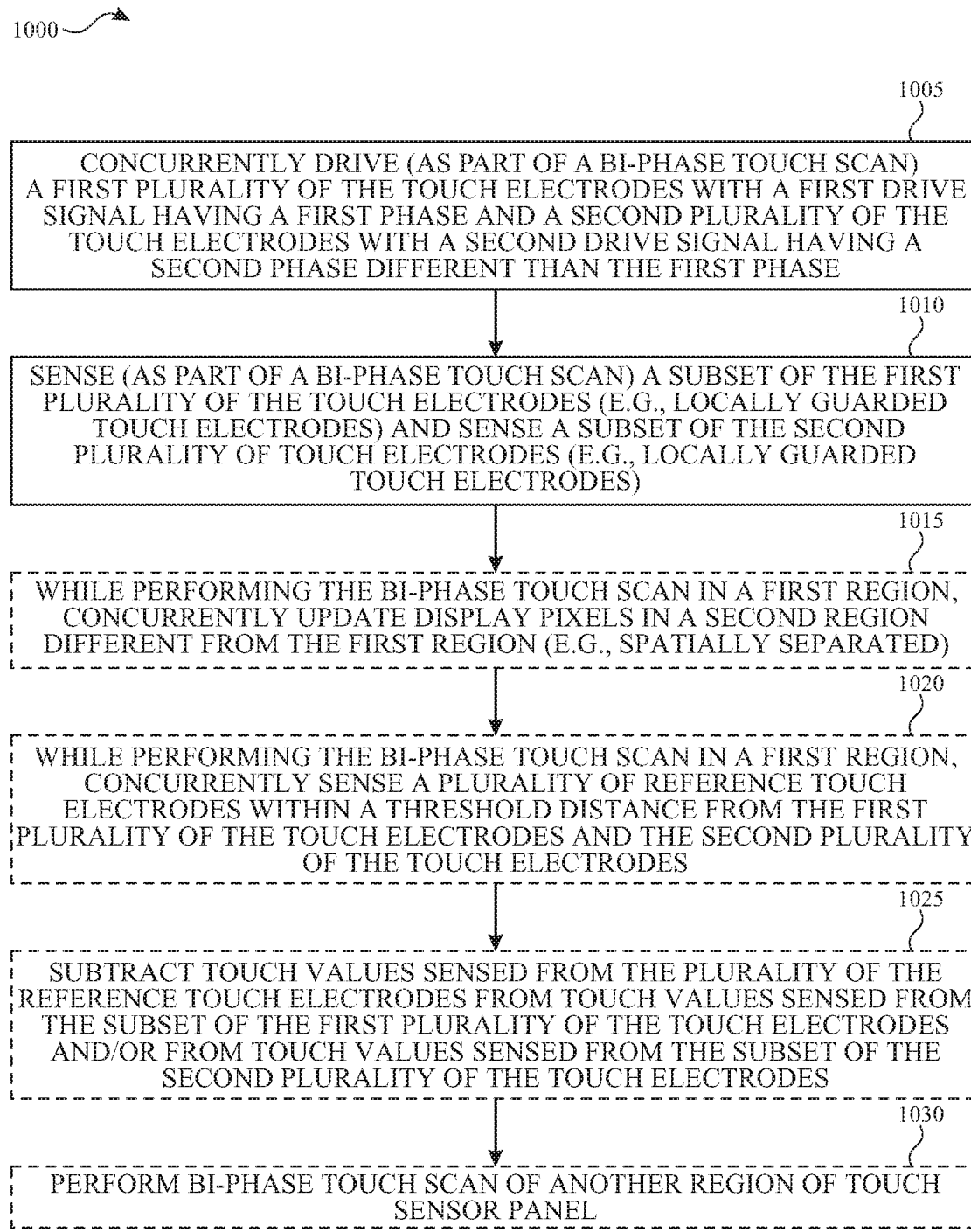
FIG. 10 illustrates an example process of operating a touch-sensitive device using a bi-phase touch scan according to examples of the disclosure.

FIG. 10 illustrates an example process 1000 of operating a touch-sensitive device using a bi-phase touch scan according to examples of the disclosure. At 1005, the system can concurrently drive a first plurality of the touch electrodes with a first drive signal having a first phase (e.g., using the D+ and D+/S configurations of FIGS. 7A-7B or FIG. 8) and a second plurality of the touch electrodes with a second drive signal having a second phase different than the first phase (e.g., using the D- and D-/S configurations of FIGS. 7A-7B or FIG. 8). At 1010, the system can sense a subset of the first plurality of the touch electrodes (e.g., locally guarded touch electrodes) and sense a subset of the second plurality of touch electrodes (e.g., locally guarded touch electrodes). In some examples, the charge can be balanced on a per-axis basis (e.g., per column of touch electrodes for columnar drive lines). For example, the charge can be balanced when an equal number of touch electrodes are driven with the first phase and driven with the second phase along the axis. In some examples, the charge can be balanced on a localized region basis (e.g., over a two dimensional region of touch electrodes of less than a threshold size).

At 1015, while the system performs the bi-phase touch scanning (according to 1005 and 1010) in a first region of the touch screen, the system can concurrently update display pixels in a second region of the touch screen. The first region of the touch screen and the second region of the touch screen can be spatially separate to reduce potential interference between the touch and display systems.

At 1020, while the system performs the bi-phase touch scanning (according to 1005 and 1010) in a first region of the touch screen, the system can concurrently sense a plurality of reference touch electrodes within a threshold distance from the first plurality of the touch electrodes and the second plurality of the touch electrodes. At 1025, touch values (touch signals) sensed from the plurality of the reference touch electrodes can be subtracted from touch values (touch signals) sensed from the subset of the first plurality of the touch electrodes and from touch values sensed from the subset of the second plurality of the touch electrodes. In some examples, the subtraction can be done on a per-axis basis (e.g., per-column).

At 1030, the system can perform bi-phase touch scanning of another region of touch sensor panel. For example, in a subsequent scan step the system can a concurrently drive a third plurality of the touch electrodes with the first drive signal and a fourth plurality of the touch electrodes with the second drive signal. The system can also sense a subset of the third plurality of the touch electrodes (e.g., locally guarded touch electrodes) and sense a subset of the fourth plurality of touch electrodes (e.g., locally guarded touch electrodes). In some examples, the charge can be balanced on a per-axis basis (e.g., per column for columnar drive lines). For example, the charge can be balanced when an equal number of touch electrodes are driven with the first drive signal and driven with the second drive signal along the axis. In some examples, the charge can be balanced on a localized region basis (e.g., over a two dimensional region of touch electrodes of less than a threshold size). Additionally or alternatively, the system can perform bi-phase touch scanning of the same region of touch, but shifting the pattern of the driving and sensing configurations to sense different touch electrodes in the region.

In some examples, while the system performs the bi-phase touch scanning (according to 1030) in another region of the touch screen, the system can concurrently update display pixels in different, spatially separated region of the touch screen (in a similar manner as at 1015) and/or measure reference touch electrodes for subtraction of display noise (in a similar manner as at 1020 and 1025). In some examples, the bi-phase touch scanning and display updating can continue for different regions until a touch image can be captured and a display image can be updated for the entire touch screen. The bi-phase touch scanning and display updating can then repeat according to the touch frame rate and display frame repeat to repeatedly scan for touch and update display images.

Process 1000 can be performed at an electronic device or system (e.g., mobile telephone 126, digital media player 140, personal computer 144, tablet computing device 148, wearable device 150, etc.), optionally using sensing circuitry and/or processing circuitry (e.g., touch controller 206 and/or touch processor 202). It should be understood that the particular order of the description of the operations in process 1000 is merely exemplary and is not intended to indicate that the described order is the only order in which the operations could be performed. One of ordinary skill in the art would recognize various ways to reorder the operations described herein (e.g., some operations of process 1000 can be combined, reordered and/or omitted).

Therefore, according to the above, some examples of the disclosure are directed to an electronic device. The electronic device can comprise: a touch screen including a display and touch electrodes; sensing circuitry coupled to the touch electrodes and configured to drive or sense the touch electrodes; and processing circuitry. The processing circuitry can be configured to: concurrently drive a first plurality of the touch electrodes with a first drive signal with a first phase and a second plurality of the touch electrodes with a second drive signal with a second phase different than the first phase; sense a subset of the first plurality of the touch electrodes; and sense a subset of the second plurality of the touch electrodes. Adjacent touch electrodes of each of the subset of the first plurality of the touch electrodes can be driven with the first drive signal; and adjacent touch electrodes of each of the subset of the second plurality of touch electrodes can be driven with the second drive signal. Additionally or alternatively to one or more of the examples disclosed above, in some examples, the adjacent touch electrodes of a respective sensed touch electrode of the subset of the first plurality of the touch electrodes can include one or more of the touch electrodes on a first axis and one or more of the touch electrodes on a second axis different from the first axis without an intervening touch electrode between the adjacent touch electrodes and the respective sensed touch electrode. Additionally or alternatively to one or more of the examples disclosed above, in some examples, a number of the first plurality of the touch electrodes driven with the first drive signal along a first axis and a number of the second plurality of touch electrodes driven with the second drive signal along the first axis can be the same. Additionally or alternatively to one or more of the examples disclosed above, in some examples, a number of the first plurality of the touch electrodes driven with the first drive signal along a first axis and a number of the second plurality of touch electrodes driven with the second drive signal along the first axis can be different, and a number of the first plurality of the touch electrodes driven with the first drive signal in a first region and a number of the second plurality of touch electrodes driven with the second drive signal in the first region can be the same. Additionally or alternatively to one or more of the examples disclosed above, in some examples, the first plurality of the touch electrodes and the second plurality of the touch electrodes can be disposed in a contiguous region of the touch screen using interlocking configuration patterns of the first plurality of the touch electrodes and configuration patterns of the second plurality of the touch electrodes. Additionally or alternatively to one or more of the examples disclosed above, in some examples, the subset of the first plurality of the touch electrodes can be arranged along diagonal axes and the subset of the second plurality of the touch electrodes can be arranged along diagonal axes. Additionally or alternatively to one or more of the examples disclosed above, in some examples, the processing circuitry can be configured to: after concurrently driving the first plurality of the touch electrodes with the first drive signal and the second plurality of the touch electrodes with the second drive signal: concurrently drive a third plurality of the touch electrodes with the first drive signal and the fourth plurality of the touch electrodes with the second drive signal; sense a subset of the third plurality of the touch electrodes; and sense a subset of the fourth plurality of the touch electrodes. The adjacent touch electrodes of each of the subset of the third plurality of the touch electrodes can be driven with the first drive signal; and the adjacent touch electrodes of each of the subset of the fourth plurality of touch electrodes can be driven with the second drive signal. The subset of the third plurality of the touch electrodes can be offset relative to the first plurality of the touch electrodes and the subset of the fourth plurality of the touch electrodes can be offset relative to the second plurality of touch electrodes. Additionally or alternatively to one or more of the examples disclosed above, in some examples, the first plurality of the touch electrodes and the second plurality of the touch electrodes can be disposed within a first region of the touch screen. The processing circuitry can be further configure to update display pixels of the display within a second region of the touch screen different from the first region concurrently with driving the first plurality of the touch electrodes and the second plurality of the touch electrodes. Additionally or alternatively to one or more of the examples disclosed above, in some examples, the processing circuitry can be further configured to: sense a third plurality of the touch electrodes within a threshold distance from the first plurality of the touch electrodes and the second plurality of the touch electrodes without driving the third plurality of the touch electrodes; and subtract touch values from the third plurality of the touch electrodes from touch values sensed from the subset of the first plurality of the touch electrodes and from touch values sensed from the subset of the second plurality of the touch electrodes. A respective touch value from one of the third plurality of touch electrodes along an axis can be subtracted from a respective touch value from one of the subset of the first plurality of the touch electrodes or from one of the subset of the second plurality of the touch electrodes. Additionally or alternatively to one or more of the examples disclosed above, in some examples, the first plurality of the touch electrodes and the second plurality of the touch electrodes can be disposed in a region of the touch screen using configuration patterns of the first plurality of the touch electrodes, using configuration patterns of the second plurality of the touch electrodes, and using floating or grounded touch electrodes between the first plurality of the touch electrodes and the second plurality of the touch electrodes.

Some examples of the disclosure are directed to a method of operating a touch screen. The method can comprise: concurrently driving a first plurality of touch electrodes with a first drive signal with a first phase and a second plurality of touch electrodes with a second drive signal with a second phase different than the first phase; sensing a subset of the first plurality of the touch electrodes; and sensing a subset of the second plurality of the touch electrodes. Adjacent touch electrodes of each of the subset of the first plurality of the touch electrodes can be driven with the first drive signal; and adjacent touch electrodes of each of the subset of the second plurality of touch electrodes can be driven with the second drive signal. Additionally or alternatively to one or more of the examples disclosed above, in some examples, the adjacent touch electrodes of a respective sensed touch electrode of the subset of the first plurality of the touch electrodes can include one or more of the touch electrodes on a first axis and one or more of the touch electrodes on a second axis different from the first axis without an intervening touch electrode between the adjacent touch electrodes and the respective sensed touch electrode. Additionally or alternatively to one or more of the examples disclosed above, in some examples, a number of the first plurality of the touch electrodes driven with the first drive signal along a first axis and a number of the second plurality of touch electrodes driven with the second drive signal along the first axis can be the same. Additionally or alternatively to one or more of the examples disclosed above, in some examples, a number of the first plurality of the touch electrodes driven with the first drive signal along a first axis and a number of the second plurality of touch electrodes driven with the second drive signal along the first axis can be different, and a number of the first plurality of the touch electrodes driven with the first drive signal in a first region and a number of the second plurality of touch electrodes driven with the second drive signal in the first region can be the same. Additionally or alternatively to one or more of the examples disclosed above, in some examples, the first plurality of the touch electrodes and the second plurality of the touch electrodes can be disposed in a contiguous region of the touch screen using interlocking configuration patterns of the first plurality of the touch electrodes and configuration patterns of the second plurality of the touch electrodes. Additionally or alternatively to one or more of the examples disclosed above, in some examples, the subset of the first plurality of the touch electrodes can be arranged along diagonal axes and the subset of the second plurality of the touch electrodes can be arranged along diagonal axes. Additionally or alternatively to one or more of the examples disclosed above, in some examples, the method can further comprise: after concurrently driving the first plurality of the touch electrodes with the first drive signal and the second plurality of the touch electrodes with the second drive signal: concurrently driving a third plurality of the touch electrodes with the first drive signal and the fourth plurality of the touch electrodes with the second drive signal; sensing a subset of the third plurality of the touch electrodes; and sensing a subset of the fourth plurality of the touch electrodes. The adjacent touch electrodes of each of the subset of the third plurality of the touch electrodes can be driven with the first drive signal; and the adjacent touch electrodes of each of the subset of the fourth plurality of touch electrodes can be driven with the second drive signal. The subset of the third plurality of touch electrodes can be offset relative to the first plurality of the touch electrodes and the subset of the fourth plurality of the touch electrodes can be offset relative to the second plurality of touch electrodes. Additionally or alternatively to one or more of the examples disclosed above, in some examples, the first plurality of the touch electrodes and the second plurality of the touch electrodes can be disposed within a first region of the touch screen. The method can further comprise updating display pixels of a display within a second region of the touch screen different from the first region concurrently with driving the first plurality of the touch electrodes and the second plurality of the touch electrodes. Additionally or alternatively to one or more of the examples disclosed above, in some examples, the method can further comprise: sensing a third plurality of the touch electrodes within a threshold distance from the first plurality of the touch electrodes and the second plurality of the touch electrodes without driving the third plurality of the touch electrodes; and subtracting touch values from the third plurality of the touch electrodes from touch values sensed from the subset of the first plurality of the touch electrodes and from touch values sensed from the subset of the second plurality of the touch electrodes. A respective touch value from one of the third plurality of touch electrodes along an axis can be subtracted from a respective touch value from one of the subset of the first plurality of the touch electrodes or from one of the subset of the second plurality of the touch electrodes. Additionally or alternatively to one or more of the examples disclosed above, in some examples, the first plurality of the touch electrodes and the second plurality of the touch electrodes can be disposed in a region of the touch screen using configuration patterns of the first plurality of the touch electrodes, using configuration patterns of the second plurality of the touch electrodes, and using floating or grounded touch electrodes between the first plurality of the touch electrodes and the second plurality of the touch electrodes.

Some examples of the disclosure are directed to a non-transitory computer readable storage medium. The non-transitory computer readable storage medium can store instructions, which when executed by an electronic device comprising processing circuitry, can cause the processing circuitry to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
a touch screen including a display and touch electrodes;
sensing circuitry coupled to the touch electrodes and configured to drive or sense the touch electrodes; and
processing circuitry configured to:
concurrently drive a first plurality of the touch electrodes with a first drive signal with a first phase and a second plurality of the touch electrodes with a second drive signal with a second phase different than the first phase;
sense a subset of the first plurality of the touch electrodes, wherein a pair of horizontally adjacent touch electrodes on first opposite sides of each of the subset of the first plurality of the touch electrodes and a pair of vertically adjacent touch electrodes on second opposite sides of each of the subset of the first plurality of the touch electrodes are driven with the first drive signal; and
sense a subset of the second plurality of the touch electrodes, wherein a pair of horizontally adjacent touch electrodes on first opposite sides of each of the subset of the second plurality of touch electrodes and a pair of vertically adjacent touch electrodes on second opposite sides of each of the subset of the first plurality of the touch electrodes are driven with the second drive signal.

2. The electronic device of claim 1, wherein a number of the first plurality of the touch electrodes driven with the first drive signal along a first axis and a number of the second plurality of touch electrodes driven with the second drive signal along the first axis are the same.

3. The electronic device of claim 1, wherein a number of the first plurality of the touch electrodes driven with the first drive signal along a first axis and a number of the second plurality of touch electrodes driven with the second drive signal along the first axis are different, and a number of the first plurality of the touch electrodes driven with the first drive signal in a first region and a number of the second plurality of touch electrodes driven with the second drive signal in the first region are the same.

4. The electronic device of claim 1, wherein the first plurality of the touch electrodes and the second plurality of the touch electrodes are disposed in a contiguous region of the touch screen using interlocking configuration patterns of the first plurality of the touch electrodes and configuration patterns of the second plurality of the touch electrodes.

5. The electronic device of claim 1, wherein the subset of the first plurality of the touch electrodes are arranged along diagonal axes and wherein the subset of the second plurality of the touch electrodes are arranged along diagonal axes.

6. The electronic device of claim 1, wherein the processing circuitry is configured to:
after concurrently driving the first plurality of the touch electrodes with the first drive signal and the second plurality of the touch electrodes with the second drive signal:
concurrently drive a third plurality of the touch electrodes with the first drive signal and a fourth plurality of the touch electrodes with the second drive signal;
sense a subset of the third plurality of the touch electrodes, wherein adjacent touch electrodes of each of the subset of the third plurality of the touch electrodes is driven with the first drive signal; and
sense a subset of the fourth plurality of the touch electrodes, wherein adjacent touch electrodes of each of the subset of the fourth plurality of touch electrodes is driven with the second drive signal;
wherein the subset of the third plurality of the touch electrodes is offset relative to the first plurality of the touch electrodes and the subset of the fourth plurality of the touch electrodes is offset relative to the second plurality of touch electrodes.

7. The electronic device of claim 1, wherein the first plurality of the touch electrodes and the second plurality of the touch electrodes are disposed within a first region of the touch screen and wherein the processing circuitry is further configure to update display pixels of the display within a second region of the touch screen different from the first region concurrently with driving the first plurality of the touch electrodes and the second plurality of the touch electrodes.

8. The electronic device of claim 1, wherein the processing circuitry is further configured to:
sense a third plurality of the touch electrodes within a threshold distance from the first plurality of the touch electrodes and the second plurality of the touch electrodes without driving the third plurality of the touch electrodes; and
subtract touch values from the third plurality of the touch electrodes from touch values sensed from the subset of the first plurality of the touch electrodes and from touch values sensed from the subset of the second plurality of the touch electrodes, wherein a respective touch value from one of the third plurality of touch electrodes along an axis is subtracted from a respective touch value from one of the subset of the first plurality of the touch electrodes or from one of the subset of the second plurality of the touch electrodes.

9. The electronic device of claim 1, wherein the first plurality of the touch electrodes and the second plurality of the touch electrodes are disposed in a region of the touch screen using configuration patterns of the first plurality of the touch electrodes, using configuration patterns of the second plurality of the touch electrodes, and using floating or grounded touch electrodes between the first plurality of the touch electrodes and the second plurality of the touch electrodes.

10. A method comprising:
concurrently driving a first plurality of touch electrodes of a touch screen with a first drive signal with a first phase and a second plurality of touch electrodes with a second drive signal with a second phase different than the first phase;
sensing a subset of the first plurality of the touch electrodes of the touch screen, wherein a pair of horizontally adjacent touch electrodes on first opposite sides of each of the subset of the first plurality of the touch electrodes and a pair of vertically adjacent touch electrodes on second opposite sides of each of the subset of the first plurality of the touch electrodes are driven with the first drive signal; and
sensing a subset of the second plurality of the touch electrodes, wherein a pair of horizontally adjacent touch electrodes on first opposite sides of each of the subset of the second plurality of touch electrodes and a pair of vertically adjacent touch electrodes on second opposite sides of each of the subset of the first plurality of the touch electrodes are driven with the second drive signal.

11. The method of claim 10, wherein a number of the first plurality of the touch electrodes driven with the first drive signal along a first axis and a number of the second plurality of touch electrodes driven with the second drive signal along the first axis are the same.

12. The method of claim 10, wherein a number of the first plurality of the touch electrodes driven with the first drive signal along a first axis and a number of the second plurality of touch electrodes driven with the second drive signal along the first axis are different, and a number of the first plurality of the touch electrodes driven with the first drive signal in a first region and a number of the second plurality of touch electrodes driven with the second drive signal in the first region are the same.

13. The method of claim 10, further comprising:
after concurrently driving the first plurality of the touch electrodes with the first drive signal and the second plurality of the touch electrodes with the second drive signal:
concurrently driving a third plurality of the touch electrodes with the first drive signal and a fourth plurality of the touch electrodes with the second drive signal;
sensing a subset of the third plurality of the touch electrodes, wherein adjacent touch electrodes of each of the subset of the third plurality of the touch electrodes is driven with the first drive signal; and
sensing a subset of the fourth plurality of the touch electrodes, wherein adjacent touch electrodes of each of the subset of the fourth plurality of touch electrodes is driven with the second drive signal;
wherein the subset of the third plurality of the touch electrodes is offset relative to the first plurality of the touch electrodes and the subset of the fourth plurality of the touch electrodes is offset relative to the second plurality of touch electrodes.

14. The method of claim 10, further comprising:
sensing a third plurality of the touch electrodes within a threshold distance from the first plurality of the touch electrodes and the second plurality of the touch electrodes without driving the third plurality of the touch electrodes; and
subtracting touch values from the third plurality of the touch electrodes from touch values sensed from the subset of the first plurality of the touch electrodes and from touch values sensed from the subset of the second plurality of the touch electrodes, wherein a respective touch value from one of the third plurality of touch electrodes along an axis is subtracted from a respective touch value from one of the subset of the first plurality of the touch electrodes or from one of the subset of the second plurality of the touch electrodes.

15. The method of claim 10, wherein the first plurality of the touch electrodes and the second plurality of the touch electrodes are disposed in a region of the touch screen using configuration patterns of the first plurality of the touch electrodes, using configuration patterns of the second plurality of the touch electrodes, and using floating or grounded touch electrodes between the first plurality of the touch electrodes and the second plurality of the touch electrodes.

16. A non-transitory computer readable storage medium storing instructions, which when executed by an electronic device including processing circuitry, cause the electronic device to:
concurrently drive a first plurality of touch electrodes with a first drive signal with a first phase and a second plurality of touch electrodes with a second drive signal with a second phase different than the first phase;
sense a subset of the first plurality of the touch electrodes, wherein a pair of horizontally adjacent touch electrodes on first opposite sides of each of the subset of the first plurality of the touch electrodes and a pair of vertically adjacent touch electrodes on second opposite sides of each of the subset of the first plurality of the touch electrodes are driven with the first drive signal; and
sense a subset of the second plurality of the touch electrodes, wherein a pair of horizontally adjacent touch electrodes on first opposite sides of each of the subset of the second plurality of touch electrodes and a pair of vertically adjacent touch electrodes on second opposite sides of each of the subset of the first plurality of the touch electrodes are driven with the second drive signal.

17. The non-transitory computer readable storage medium of claim 16, wherein a number of the first plurality of the touch electrodes driven with the first drive signal along a first axis and a number of the second plurality of touch electrodes driven with the second drive signal along the first axis are the same.

18. The non-transitory computer readable storage medium of claim 16, wherein a number of the first plurality of the touch electrodes driven with the first drive signal along a first axis and a number of the second plurality of touch electrodes driven with the second drive signal along the first axis are different, and a number of the first plurality of the touch electrodes driven with the first drive signal in a first region and a number of the second plurality of touch electrodes driven with the second drive signal in the first region are the same.

19. The non-transitory computer readable storage medium of claim 16, the instructions when executed by the electronic device further cause the electronic device to:
   after concurrently driving the first plurality of the touch electrodes with the first drive signal and the second plurality of the touch electrodes with the second drive signal:
      concurrently drive a third plurality of the touch electrodes with the first drive signal and the fourth plurality of the touch electrodes with the second drive signal;
      sense a subset of the third plurality of the touch electrodes, wherein adjacent touch electrodes of each of the subset of the third plurality of the touch electrodes is driven with the first drive signal; and
      sense a subset of the fourth plurality of the touch electrodes, wherein adjacent touch electrodes of each of the subset of the fourth plurality of touch electrodes is driven with the second drive signal;
   wherein the subset of the third plurality of the touch electrodes is offset relative to the first plurality of the touch electrodes and the subset of a fourth plurality of the touch electrodes is offset relative to the second plurality of touch electrodes.

20. The non-transitory computer readable storage medium of claim 16, the instructions when executed by the electronic device further cause the electronic device to:
   sense a third plurality of the touch electrodes within a threshold distance from the first plurality of the touch electrodes and the second plurality of the touch electrodes without driving the third plurality of the touch electrodes; and
   subtract touch values from the third plurality of the touch electrodes from touch values sensed from the subset of the first plurality of the touch electrodes and from touch values sensed from the subset of the second plurality of the touch electrodes, wherein a respective touch value from one of the third plurality of touch electrodes along an axis is subtracted from a respective touch value from one of the subset of the first plurality of the touch electrodes or from one of the subset of the second plurality of the touch electrodes.

\* \* \* \* \*